United States Patent

Nishizawa

[11] Patent Number: 5,169,173
[45] Date of Patent: Dec. 8, 1992

[54] MECHANICAL SENSOR FOR VEHICLE SEAT BELT SYSTEMS

[75] Inventor: Muneo Nishizawa, Shiga, Japan

[73] Assignee: Takata Corporation, Tokyo, Japan

[21] Appl. No.: 714,450

[22] Filed: Jun. 13, 1991

[30] Foreign Application Priority Data

Jun. 13, 1990 [JP] Japan .................. 2-154330

[51] Int. Cl.$^5$ .................. B60R 22/36; B65H 75/48
[52] U.S. Cl. .................. 280/806; 180/282;
242/107; 200/61.45 R; 297/480
[58] Field of Search .......... 280/806; 180/282;
200/61.45 R, 61.53, 61.58 B; 297/480;
242/107.4 A, 107

[56] References Cited

U.S. PATENT DOCUMENTS

| | | | |
|---|---|---|---|
| 3,631,728 | 1/1972 | Prachar et al. | 200/61.53 |
| 3,638,501 | 2/1972 | Prachar | 200/61.53 |
| 4,427,216 | 1/1984 | Kato et al. | 280/806 |
| 4,435,000 | 3/1984 | Chiba et al. | 280/806 |
| 4,948,171 | 8/1990 | Knabel et al. | 280/806 |

FOREIGN PATENT DOCUMENTS 57-90159 6/1982 Japan .
58-33060 8/1983 Japan .
58-206765 12/1983 Japan .
63-35017 9/1988 Japan .
1-164650 6/1989 Japan .
1-164651 6/1989 Japan .

Primary Examiner—Mitchell J. Hill
Assistant Examiner—Paul Dickson
Attorney, Agent, or Firm—Brumbaugh, Graves, Donohue & Raymond

[57] ABSTRACT

A mechanical sensor for a vehicle seat belt system comprises a casing, an inertia body mounted on the casing for movement in response to an inertial force imposed on it and an output member separate from the inertia body. A spring is coupled between the casing and the output member and biases the output member to move it relative to the casing. A release member is normally engaged between the output member and the inertial body such as to restrain the output member against movement under the bias of the spring in the absence of an inertial force on the inertia body in excess of a predetermined magnitude. Upon movement of the inertial body by an inertial force in excess of the predetermined magnitude, the inertia body releases the release member, which in turn moves out of engagement with the output member, whereupon the spring displaces the output member.

1 Claim, 2 Drawing Sheets

MECHANICAL SENSOR FOR VEHICLE SEAT BELT SYSTEMS

BACKGROUND OF THE INVENTION

The present invention relates to a mechanical sensor and, in particular, to a mechanical sensor for operating a spring-operated pretensioner of a vehicle seat belt system.

In a seat belt system provided on a vehicle, such as an automobile, a pretensioner for tensioning the belt is furnished in some cases for more securely restraining the body of an occupant in an emergency. There are various types of pretensioners, such as those that rotate the reel of the belt retractor in the belt-winding direction, those that act directly on the belt to form a loop and those that pull the buckle in a direction to tighten the belt. As the driving mechanism for such pretensioners, it is known to use a piston-cylinder operated by gunpowder or to use a spring.

A driving mechanism using gunpowder requires an electric trigger to operate, which is costly to provide and install. For this reason, a spring-operated pretensioner with a purely mechanical structure is preferred.

However, the driving mechanism to operate the pretensioner must have a sufficient operating stroke and produce the required operating force. When a spring is used in the driving mechanism, a powerful spring must be used. The preload for the spring is high, and a considerable operating force is required to release the preload. Accordingly, the output force of a trigger for operating the pretensioner also must be high.

Mechanical sensors are disclosed in Provisional Japanese Utility Model Publications No. 90159/1982 and No. 33060/1983, Japanese Utility Model Publication No. 35017/1988, and the Provisional Japanese Patent Publications No. 206765/1983, No. 164650/1989, and No. 164651/1989. According to all of these disclosures, an inertial body directly supported by a trigger is moved by inertial force to release the device.

In order to obtain a sufficiently high trigger-operating force by a conventional type mechanical sensor as described above, the inertia body for detecting acceleration must have higher inertial force, which requires a large and heavy sensor. Also, the sensor is incorporated in the pretensioner and when it is mounted on the seat of a vehicle, it is subject to the vibration of seat or seat sliding. This places a restriction on the location of the sensor.

SUMMARY OF THE INVENTION

To solve the above problems, the object of the present invention is to provide a mechanical sensor for a seat belt system that provides a sufficient sensor output using a small and lightweight inertia body and that can be installed at any place in the vehicle.

The foregoing object is attained, in accordance with the present invention, by a mechanical sensor for a vehicle seat belt system comprising a casing, an inertia body mounted on the casing for movement in response to an inertial force imposed on it, an output member separate from the inertia body, a spring coupled between the casing and the output member and biasing the output member to move it relative to the casing, and a release member engaged between the output member and the inertia body such as to restrain the output member against movement under the bias of the spring in the absence of an inertial force on the inertia body in excess of a predetermined magnitude and to release the output member upon movement of the inertia body by an inertial force in excess of said predetermined magnitude by movement of the inertial body out of engagement with the release member.

In the mechanical sensor of the present invention, the force of the spring acting on the output member is transmitted to the inertia body through the release member to restrain the output member against movement under the bias of the preloaded spring. Upon an acceleration in excess of a predetermined magnitude, the inertia body moves by an inertia force, and the release member is disengaged from the inertia body, thereby releasing the output member so that it can be rapidly displaced by the force of the spring.

For a better understanding of the invention, reference may be made to the following description of exemplary embodiments, taken in conjunction with the accompanying drawings.

DESCRIPTION OF THE EMBODIMENT

Figure 1:
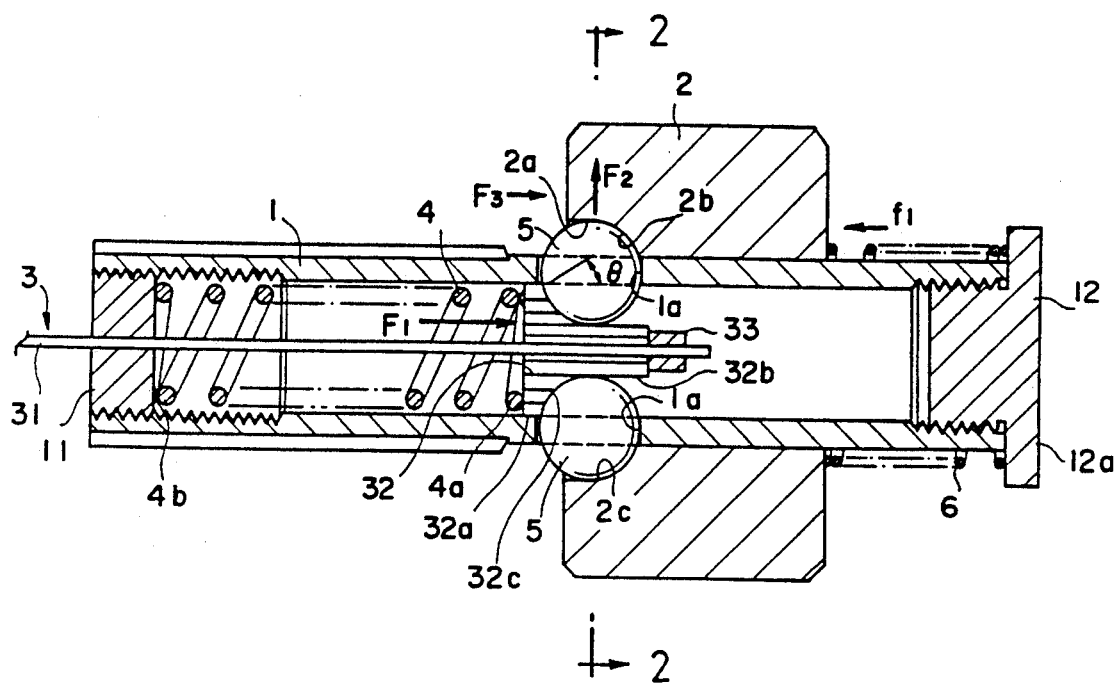
FIG. 1 is a longitudinal cross-sectional view of the embodiment.
Figure 2:
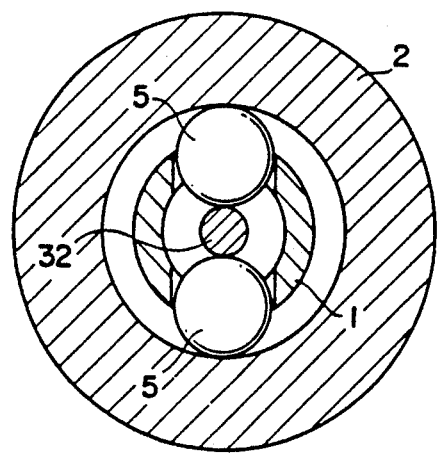
FIG. 2 is a cross-sectional view taken along the line 2—2 of FIG. 1.

The embodiment of a mechanical sensor according to the invention comprises an annular inertia body 2 slidably supported on the outer surface of a hollow cylindrical casing and an output member 3, which consists of a wire cable 31 and a cable end block 32 fixed on the end of the cable and is received in the casing. A coil drive spring 4 is received in compressed (preloaded) condition in the casing, one end 4a engaging the cable end block 32 of the output member 3 and the other supporting end 4b engaging a stopper 11, which is screwed into the casing 1. A release member engaged between the inertia body 2 and the cable end block 32 is constituted by two steel balls 5, arranged diametrically opposite each other for force-balancing reasons. Accordingly, the preload of the driving spring 4, acting on the steel balls 5, is transmitted to the inertia body 2 through the steel balls 5, and the spring 4 is restrained in the preloaded condition.

On the front end with respect to the direction of movement of the inertia body under an inertial force (which is to the right in FIG. 1), an abutment member 12 is screwed into the casing 1. A relatively weak set spring 6 is engaged under compression between the rear face of a flange 12a on the abutment member 12 and the front face of the inertia body 2. Near the center of the sensor casing 1 are holes 1a which receive the balls 5. The cable 31 passes through a hole in the end block 32, and a fall-stop block 33 is affixed to the cable in front of the end block 32.

The end block has a guide surface 32a having an outer diameter slightly less than the inner diameter of sensor casing 1 so that the end block slides freely within the casing 1 and a portion 32b of a lesser diameter than the guide surface. A concave spherical surface 32c having a curvature substantially equal to that of the steel balls 5 forms a contact surface with the balls and produces a wedging or camming action on each of the balls, thus tending to push each ball radially out of the casing by the radial vector component of a force acting on the contact surface 32a at an angle $\theta$, which is resolved from the spring force F1 as a function of the geometry of the contact area between the surface 32a and the ball and which can be varied as a matter of design of the contact area.

At the inner rear portion of the inertia body 2 is a notched recess 2c which comprises a cylindrical surface 2a and concave spherical surface 2b having a curvature approximately the same as that of the steel balls 5 and forms a contact surface in engagement with the steel balls 5.

In the set condition of the sensor, which is the condition shown in FIG. 1, each steel ball 5 has its inner portion in contact with the contact surface 32c, its front portion in contact with the front edge of the respective hole 1a in the casing 1, and its outer portion in contact with the notched recess 2c in the inertia body. In that condition, the inertia body 2 is subject to the load f1 of the set spring 6 and the radial vector component F2 acting on the ball from the spring force F1 of the preloaded coil spring 4. Thus, the inertia body 2 is held at the position shown in FIG. 1 by a frictional force F3 generated by the force F2 and by the force f1.

Under the set condition, if a high acceleration G is produced in the event of a vehicle collision and the product of the acceleration G and the mass m of the inertia body (G×m) exceeds the sum of the set load and friction force (f1+F3), the inertial body 2 is rapidly moved forward. The frictional force F3 in this case is equal to the product of the friction coefficient $\mu$ between the steel balls 5 and the inertia body 2 and the radial force vector F2 on the ball ($\mu \times$F2), provided that the sliding frictional force between the outer surface of the casing 1 and the inner surface of the inertia body 2 are neglected.

Figure 3A:
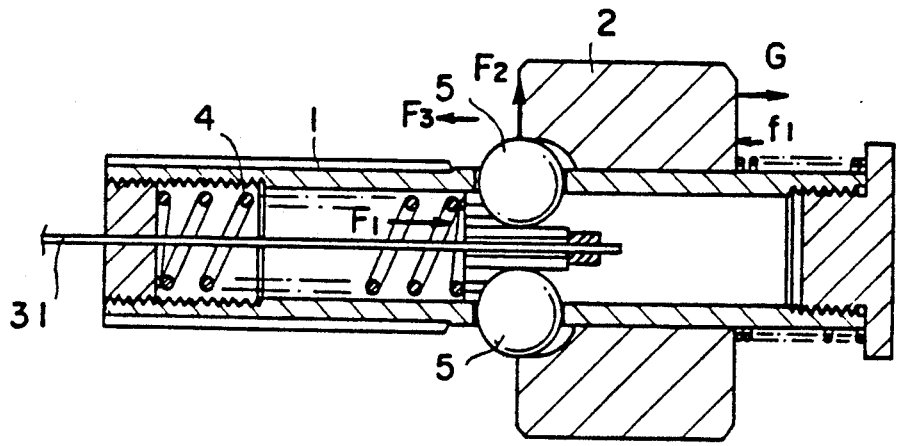
FIGS. 3A, 3B and 3C are longitudinal cross-sectional views showing the embodiment at different stages of its operation.
Figure 3B:
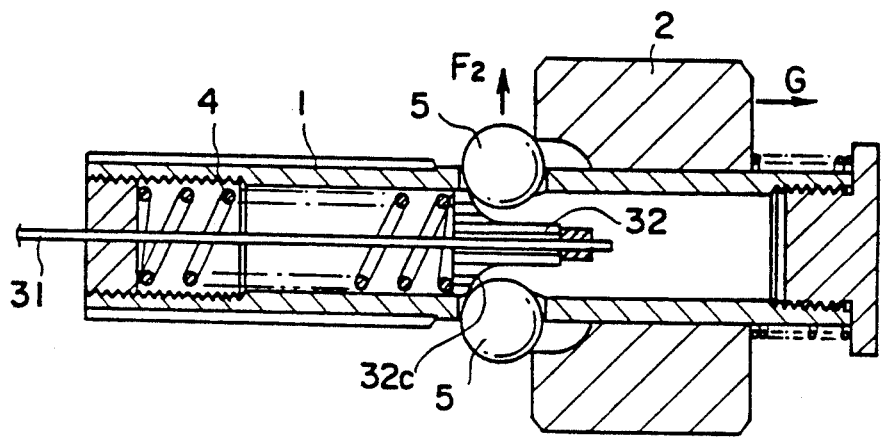
Figure 3C:
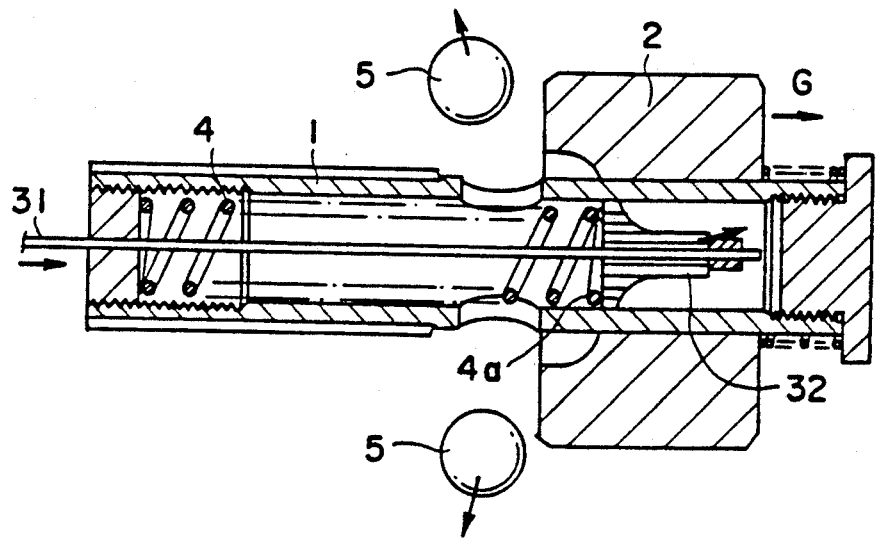

When the inertia body 2 is moved forward by the inertial force and reaches a position in which the steel balls 5 are no longer fully engaged with the inertia body, as shown in FIG. 3, the steel balls 5 are pushed by the force F2 in the radial direction by the contact surface 32c of the cable end block 32 and are expelled out of the sensor casing 1, as shown in FIG. 3C.

When the steel balls 5 are pushed out, there is nothing to restrain the forward movement of the cable end block 32, and the preload force F1 applied by the coil spring 4 is quickly released. The free end 4a of the spring pushes the cable end block 32 forward. Accordingly, the wire cable 31 is pulled forward, this displacement of the cable being the sensor output.

If the embodiment is designed so that the inertia body is moved with about 7G with the angle $\theta$ being 15 degrees and the friction coefficient $\mu$ being about 0.3, the operating force output imparted to the wire cable 31 by the spring can be by about 10 times as high as the product of the inertial body mass and the acceleration ($\mu \times$G), which is the normal sensor output. Furthermore, in the mechanical sensor of this embodiment, the level of G that produces the output can be set as desired by altering $\theta$ and/or the force F1 of the spring.

The present invention has been described above in connection with an embodiment, but the invention is not limited to this embodiment, and various modifications and changes can be conceived within the scope of the appended claim.

As described above, it is possible, in a mechanical sensor embodying this invention, to increase the moving distance and the output of the mass body and attain a higher sensor output force despite the light weight of the inertia body, because the output member is operated by the energy accumulated in the spring using the movement of the inertia body as trigger. Therefore, the present mechanical sensor makes it possible to operate the trigger mechanism in a spring-type pretensioner operated by a strong spring load and, as the result, to quickly eliminate a large amount of slack in the seat belt within the allowable time.

Also, in the mechanical sensor of this invention, the output member can be designed in any form, and this makes it possible to eliminate the positional restriction with the trigger mechanism of the spring-type pretensioner and to install it at any place desired.

I claim:

1. A mechanical sensor for a vehicle seat belt pretensioner comprising a casing, an inertia body mounted on the casing for movement in response to an inertial force imposed on it, an output device separate from the inertia body and including an end block member received within the casing for movement along an axis and a pulling member connected to the end block member and extending axially out of the casing, a spring coupled between the casing and the end block member and biasing the end block member to move it relative to the casing, and a release member engaged between the end block member and the inertial body such as to restrain the end block member against movement under the bias of the spring in the absence of an inertial force on the inertial body in excess of a predetermined magnitude and to release the end block member upon movement of the inertia body out of engagement with the release member by an inertial force in excess of said predetermined magnitude.

* * * * *